(12) United States Patent
Kumoi et al.

(10) Patent No.: US 9,480,134 B2
(45) Date of Patent: Oct. 25, 2016

(54) IMAGE PICKUP APPARATUS EFFECTIVE FOR REDUCING FALSE OPERATION DUE TO STATIC ELECTRICITY

(71) Applicant: PANASONIC INTELLECTUAL PROPERTY MANAGEMENT CO., LTD., Osaka (JP)

(72) Inventors: Masafumi Kumoi, Osaka (JP); Masato Tobinaga, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 512 days.

(21) Appl. No.: 14/107,418

(22) Filed: Dec. 16, 2013

(65) Prior Publication Data

US 2014/0104742 A1   Apr. 17, 2014

Related U.S. Application Data

(63) Continuation of application No. PCT/JP2013/001671, filed on Mar. 13, 2013.

(30) Foreign Application Priority Data

Sep. 26, 2012   (JP) ................. 2012-211837

(51) Int. Cl.
*H01H 47/00* (2006.01)
*H05F 3/00* (2006.01)
(Continued)

(52) U.S. Cl.
CPC ................ *H05F 3/00* (2013.01); *G03B 17/02* (2013.01)

(58) Field of Classification Search
CPC ................................ H05F 3/00; G03B 17/02
USPC ........................................................ 361/220
See application file for complete search history.

(56) References Cited

U.S. PATENT DOCUMENTS 7,057,642 B2 *   6/2006   Mogamiya ........... H04N 5/2254
                                                            348/207.99
7,309,176 B2    12/2007   Shirakata et al.
(Continued)

FOREIGN PATENT DOCUMENTS

JP    2002-93288      3/2002
JP    2005-301158     10/2005
(Continued)

OTHER PUBLICATIONS

JP-2005-301158, Entire specification and drawings.*
(Continued)

*Primary Examiner* — Dharti Patel
(74) *Attorney, Agent, or Firm* — Wenderoth, Lind & Ponack, L.L.P.

(57) ABSTRACT

An image pickup apparatus includes a metal body, a metallic lens barrel provided movably in an optical axis direction of an imaging optical system, and a metallic exterior casing having an opening that exposes the lens barrel from inside to outside the image pickup apparatus. The metal body includes a cut-and-raised portion formed by cutting and raising a part of the metal body, and the cut-and-raised portion is electrically connected with the exterior casing or inductively coupled with the exterior casing. The cut-and-raised portion is formed to electrically discharge the lens barrel charged with static electricity via a discharge path including the cut-and-raised portion. A static electrical current generated in the lens barrel flows to ground via the discharge path including the exterior casing, the cut-and-raised portion and the metal body, without flowing via any electric substrate, to discharge a charged lens barrel.

15 Claims, 13 Drawing Sheets

(51) Int. Cl.
*H05F 3/02* (2006.01)
*G03B 17/02* (2006.01)

(56) References Cited

U.S. PATENT DOCUMENTS

| | | | | |
|---|---|---|---|---|
| 2002/0180880 | A1* | 12/2002 | Bean | G02B 27/0006 348/335 |
| 2005/0002146 | A1* | 1/2005 | Albano | G06K 7/0082 361/220 |
| 2005/0265710 | A1* | 12/2005 | Shirakata | G02B 7/102 396/349 |
| 2011/0025850 | A1 | 2/2011 | Maekawa et al. | |
| 2011/0194235 | A1* | 8/2011 | Ikezawa | G03B 17/02 361/679.01 |

FOREIGN PATENT DOCUMENTS

| | | |
|---|---|---|
| JP | 4120940 | 5/2008 |
| JP | 2010-72096 | 4/2010 |
| JP | 4594705 | 9/2010 |
| JP | 2011-22415 | 2/2011 |
| JP | 2011-35680 | 2/2011 |
| JP | 4961360 | 3/2012 |

OTHER PUBLICATIONS

JP 4120940; Entire specificatin and drawings.*
JP 4595704; JP4961360; Entire specification and drawings.*
JP 2010-72096; Entire specification and drawings.*
International Search Report (ISR) issued Jun. 18, 2013 in International (PCT) Application No. PCT/JP2013/001671.
English translations of the International Preliminary Report on Patentability and Written Opinion issued Apr. 9, 2015 in International (PCT) Application No. PCT/JP2013/001671.
Japanese Office Action (OA) issued May 27, 2014 in corresponding Japanese Patent Application No. 2013-550686.

* cited by examiner

IMAGE PICKUP APPARATUS EFFECTIVE FOR REDUCING FALSE OPERATION DUE TO STATIC ELECTRICITY

CROSS-REFERENCE TO RELATED APPLICATIONS

This is a continuation application based on PCT application No. PCT/JP 2013/001671 as filed on Mar. 13, 2013, which claims priority to Japanese patent application No. JP 2012-211837 as filed on Sep. 26, 2012, the contents of which are incorporated herein by reference.

BACKGROUND OF THE DISCLOSURE

1. Field of the Disclosure

The present disclosure relates to an image pickup apparatus which is effective for reducing false operation due to static electricity 2. Description of the Related Art Patent Document 1 discloses an image pickup apparatus for flowing out a current generated by electrostatic discharge to ground from a lens barrel charged with static electricity in a projected state. This image pickup apparatus includes a second wiring portion, whose one end is connected with the lens frame and whose other end is electrically connected with the ground potential, and the second wiring portion is provided on the flexible substrate mounted inside the lens barrel separately from a first wiring portion supplied with a control signal. With this arrangement, the current generated by electrostatic discharge when the lens barrel is in the projected state can be made to flow out to the ground via the second wiring portion.

Prior Art Documents related to the disclosure are as follows:

Patent Document 1: Japanese patent laid-open publication No. JP 2005-301158 A;
Patent Document 2: Japanese patent publication No. JP 4120940 B;
Patent Document 3: Japanese patent publication No. JP 4594705 B;
Patent Document 4: Japanese patent publication No. JP 4961360 B;
Patent Document 5: Japanese patent laid-open publication No. JP 2010-72096 A; and
Patent Document 6: U.S. Pat. No. 7,057,642.

SUMMARY OF THE DISCLOSURE

The present disclosure provides an image pickup apparatus which is effective for reducing false operation due to static electricity.

According to the present disclosure, there is provided an image pickup apparatus including a metal body, a metallic lens barrel provided movably in an optical axis direction of an imaging optical system, and a metallic exterior casing having an opening that exposes the lens barrel from inside to outside the image pickup apparatus. The metal body comprises a cut-and-raised portion formed by cutting and raising a part of the metal body, and the cut-and-raised portion is electrically connected with the exterior casing or inductively coupled with the exterior casing. The cut-and-raised portion is formed to electrically discharge the lens barrel charged with static electricity via a discharge path including the cut-and-raised portion. A static electrical current generated in the lens barrel flows to ground via the discharge path including the exterior casing, the cut-and-raised portion and the metal body, without flowing via any electric substrate, to discharge a charged lens barrel.

The image pickup apparatus of the present disclosure is effective for reducing false operation due to static electricity.

BRIEF DESCRIPTION OF THE DRAWINGS

These and other objects and features of the present disclosure will become clear from the following description taken in conjunction with embodiments thereof with reference to the accompanying drawings throughout which like parts are designated by like reference numerals, and in which.

DETAILED DESCRIPTION OF THE EMBODIMENTS

Figure 1:
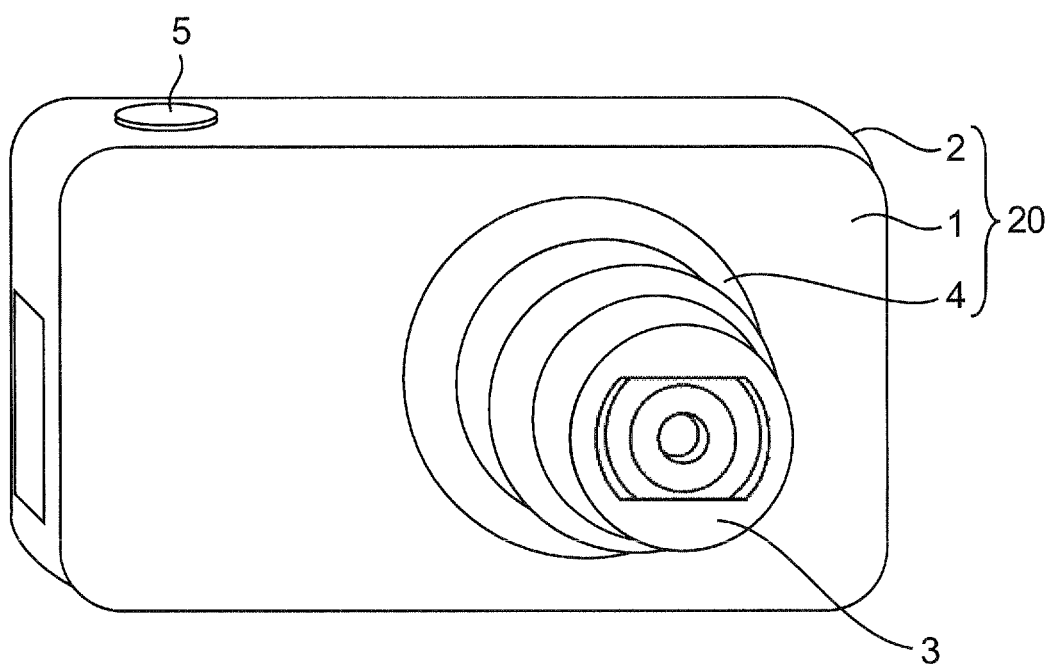
FIG. 1 is a perspective view showing an external appearance of a digital camera 100 according to a first embodiment.

Embodiments will be described below arbitrarily with reference to the drawings. It is noted that detailed descriptions more than necessary are sometimes omitted. For example, it is sometimes the case where detailed descriptions of well-known matters and repetitive descriptions for substantially identical configurations are omitted. This is to prevent the following description from becoming unnecessarily redundant and to facilitate easy understanding by those skilled in the art.

The inventor and others provide the accompanying drawings and the following description for sufficient understanding of the present disclosure by those skilled in the art, and do not intend to limit the subjects described in the claims by them.

Static electricity is generated in the casing exterior of an image pickup apparatus when the user touches the image pickup apparatus such as a digital still camera or a digital video camera or in a similar case, and then, a current flows from the casing exterior into the metallic parts and an electric circuit inside the apparatus. Hereinafter, the current that flows due to static electricity is referred to as an electrostatic current. When the electrostatic energy is relatively large, the electrostatic current flows into the electric circuit that controls the operation of the image pickup apparatus and even into the power supply circuit provided for operating the electric circuit. The electrostatic current causes an inoperative state of the functions of the image pickup apparatus, and in some instances, and this leads to adverse effects such as the destruction of the electronic parts mounted on the electric circuit.

In recent years, it is a mainstream to metalize the lens barrel from the viewpoint of design decoration and securing the strength against drop impact. Moreover, there is such a tendency that narrow spaces increase between the lens barrel and the metallic exterior. If static electricity is generated in such a narrow space, electrostatic discharge easily occurs. Moreover, it has been known that, since the discharge resistance of a narrow space between metallic conductors is comparatively small, metallic conductors are inductively coupled with each other, increasing the electrostatic energy. Further, in accordance with the technical development of the optical system, a compact retractable lens of high magnification (high zoom) is also mounted in the image pickup apparatus. The compact retractable lens includes a concentric multiple telescopic metallic lens barrel structure, and this also becomes a factor of increasing the electrostatic energy in the narrow spaces between the metallic conductors. Moreover, intervals between metallic conductor parts have narrowed in accordance with the size reduction of the image pickup apparatus, and an electrostatic current easily flows to the flexible substrate.

Since the retractable lens barrel that projects from the casing exterior at the time of imaging moves in the zoom operation and the like, a predetermined gap is provided between the lens barrel and the casing exterior. Moreover, a flexible substrate for supplying a control signal from an electric circuit for controlling the lens operations of zoom, focusing and the like to the operating part is provided inside the lens barrel. In such an image pickup apparatus, an electrostatic current flows to the electric circuit via the flexible substrate even when the electrostatic current flows from the lens barrel portion or the like charged with static electricity into the flexible substrate due to aerial discharge, and this leads to possible adverse effects on the operation of the electric circuit and the electronic parts configuring the electric circuit.

The inventor and others of the present application conducted examinations and experiments of a configuration to efficiently reduce the false operation of the image pickup apparatus due to static electricity in order to solve such a problem.

First Embodiment

Figure 2:
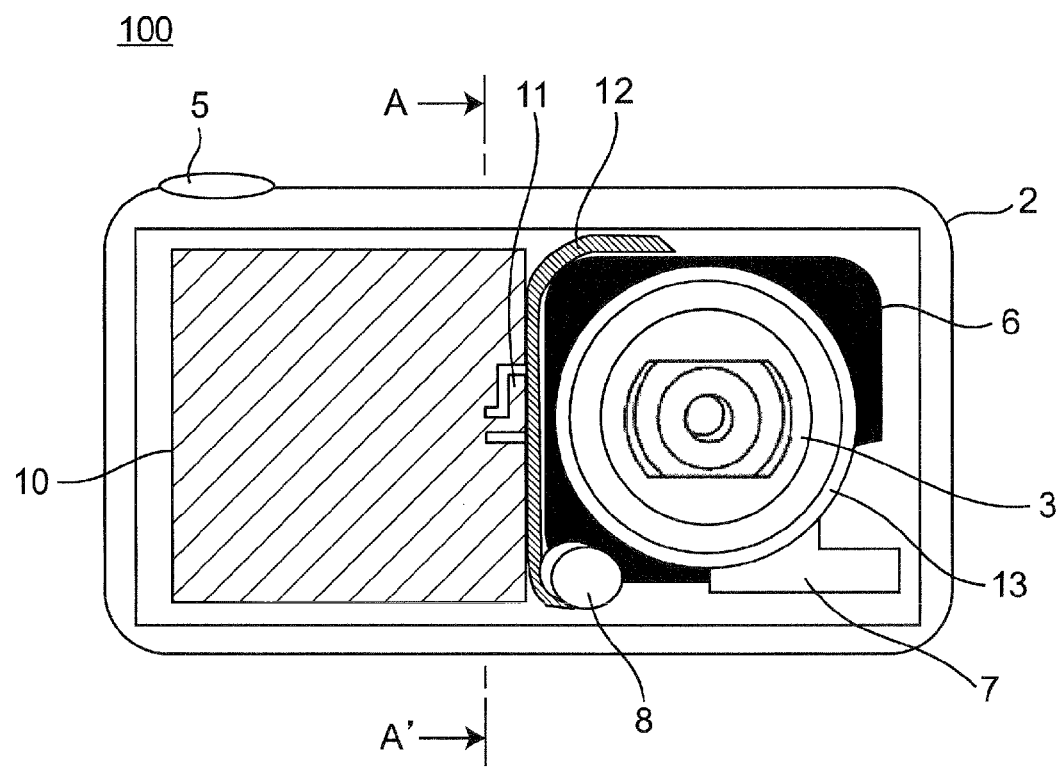
FIG. 2 is a front view showing a configuration of the digital camera 100 when a front casing 1 and a lens-decorative ring 4 of FIG. 1 are detached.
Figure 3:
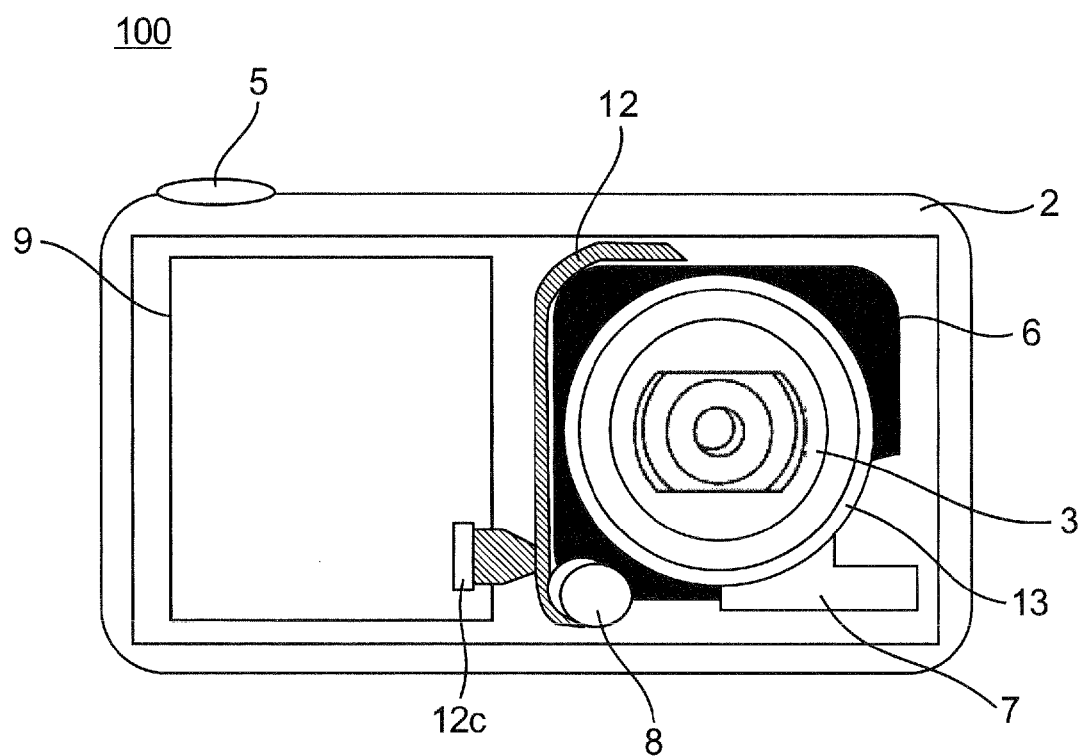
FIG. 3 is a front view showing a configuration of the digital camera 100 when a battery casing 10 is further detached from the front view of FIG. 2.
Figure 4:
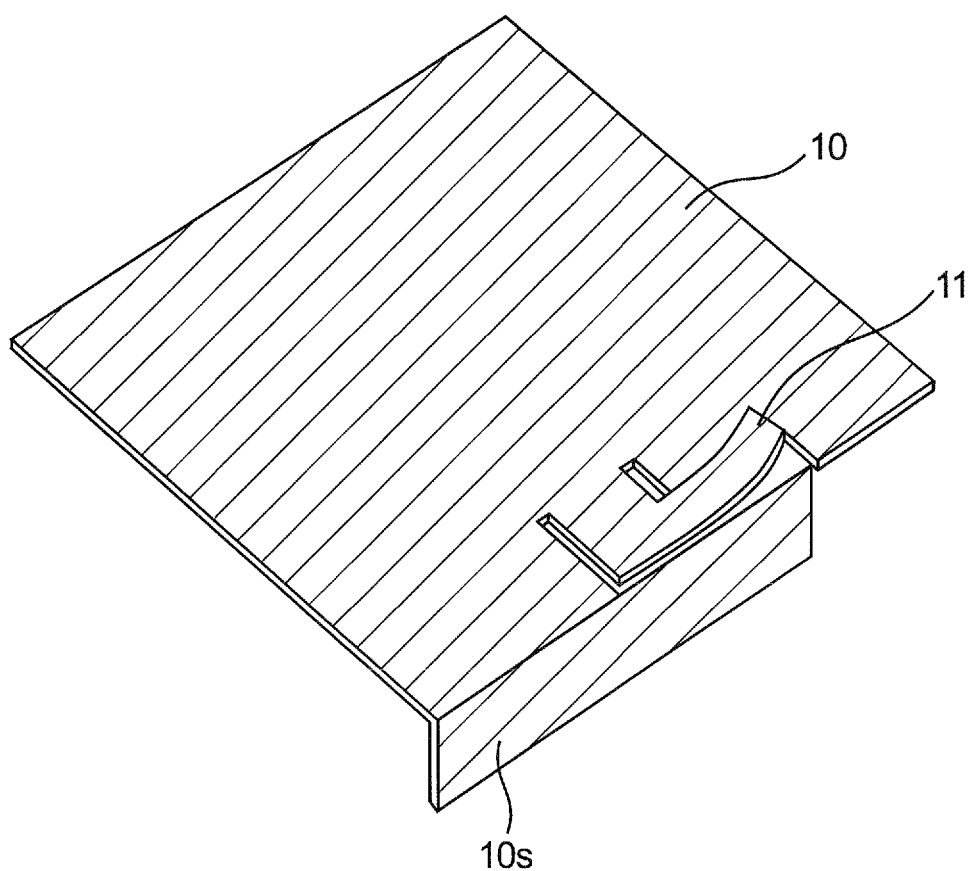
FIG. 4 is perspective view showing a configuration of a cut-and-raised portion 11 provided at the battery casing 10 of FIG. 2.
Figure 5:
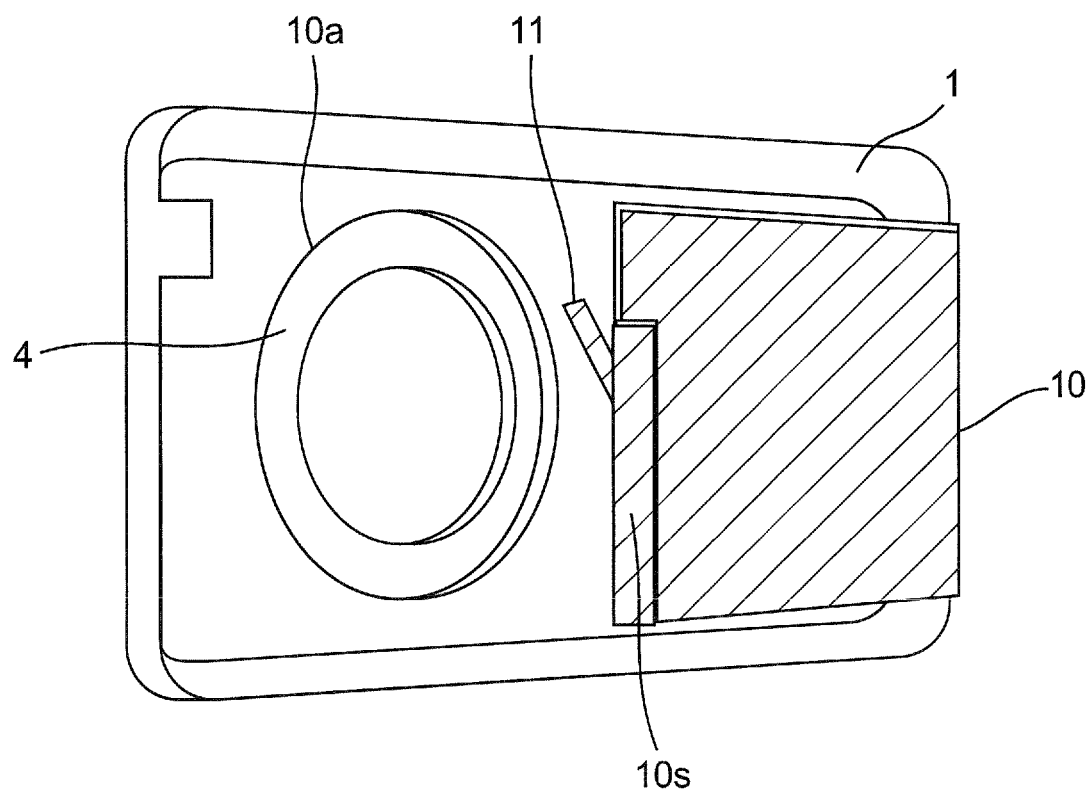
FIG. 5 is a perspective view showing the front casing 1, the battery casing 10, the cut-and-raised portion 11 and the lens-decorative ring 4 of FIG. 1.
Figure 6:
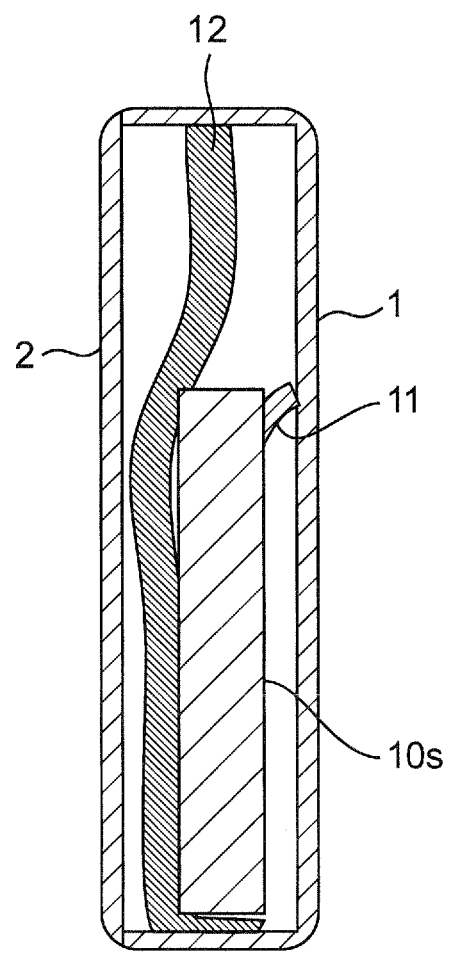
FIG. 6 is a sectional view along a line A-A' of FIG. 2.

A first embodiment is described with reference to FIGS. 1 to 7.
1-1. Configuration
FIG. 1 is a perspective view showing an external appearance of a digital camera 100 according to the first embodiment, and FIG. 2 is a front view showing a configuration of the digital camera 100 when the front casing 1 and the lens-decorative ring 4 of FIG. 1 are detached. FIG. 3 is a front view showing a configuration of the digital camera 100 when a battery casing 10 is further detached from the front view of FIG. 2, and FIG. 4 is a perspective view showing a configuration of a cut-and-raised portion 11 provided at the battery casing 10 of FIG. 2. Further, FIG. 5 is a perspective view showing a front casing 1 of FIG. 1, the battery casing 10, the cut-and-raised portion 11, and the lens-decorative ring 4, and FIG. 6 is a sectional view along the line A-A' of FIG. 2. In the present embodiment and each of the following embodiments, the surface on the subject side of the digital cameras 100, 100A, 100B and 100C is referred to as a front face, and the face on the imaging side is referred to as a back face for the sake of convenience of explanation.

Referring to FIGS. 1 to 3, the digital camera 100 is configured by housing the main body of the camera and the battery casing 10, in an exterior casing 20 configured to include a metallic front casing 1, a metallic back casing 2, and a metallic lens-decorative ring 4. The faces of the exterior casing 20 including the front casing 1, the back casing 2 and the lens-decorative ring 4 are made to be non-conductive with coating and alumite treatment. Moreover, referring to FIG. 1, operating buttons of a shutter release button 5 to accept shutter operation by the user and so on are provided on an upper surface portion of the exterior casing 20. The front casing 1 on the front face of the exterior casing 20 includes an opening 10a for exposing the lens barrel 3 from the inside to the outside of the digital camera 100. The lens-decorative ring 4 is fixed on the front face side of the opening 10a of the front casing 1, and the lens barrel 3 is provided in the lens-decorative ring 4. In this case, a predetermined gap is provided between the lens barrel 3 and the lens-decorative ring 4. Further, the lens barrel 3 is fixed to a metallic lens barrel frame 13 for fixing the lens barrel 3 to the main body of the camera. Moreover, although the following is not shown in Figures, a camera monitor, an electronic viewfinder, a liquid crystal display and so on are provided on the back casing 2 on the back face of the exterior casing 20.

Referring to FIG. 2, the main body of the camera is configured to include the lens barrel 3, a lens barrel frame 13, a resin-made lens unit 6 for housing the lens barrel 3, a zoom motor 7 and a focus motor 8 for driving the lens barrel 3, an electronic circuit substrate 9 (See FIG. 3), a flexible cable 12, and an image sensor (not shown). The parts 3, 6 to 9, 12 and 13 of the main body of the camera are arranged at the respective predetermined locations of a space in the exterior casing.

In this case, the lens barrel 3 is a concentric double telescopic lens barrel, which is provided movably in the optical axis direction of the imaging optical system and modally exposed to the outside of the exterior casing 20. The lens barrel 3 is made of a metal of aluminum or the like, and has its surface processed with alumite treatment or coating. The lens barrel 3 is controlled to extend and contract from the housed state shown in FIG. 2 in accordance with the zoom state shown in FIG. 1 at the time of imaging. Moreover, the image sensor is mounted on the back face of the lens barrel 3 and configured to include a CCD (Charge Coupled Device), a CMOS (Complementary Metal Oxide Semiconductor Image Sensor) or the like to pick up the optical image formed by the optical system including the lens barrel 3. The lens barrel 3 projects the subject image that is the optical image of the subject incident via the lens onto the image sensor. The image sensor converts the projected subject image into image data to generate still picture data, motion picture data or the like.

Referring to FIG. 2, the battery casing 10 is provided in the exterior casing 20. The battery casing 10 is formed of a metal material of aluminum or the like in a rectangular shape substantially parallel to the sheet plane of FIG. 2, and houses a battery (not shown) that is the power source of the digital camera 100. As shown in FIG. 4, a portion on the lens barrel 3 side of the battery casing 10 is bent substantially at the right angle toward the back face of the digital camera 100, and this leads to formation of a side face 10s. Further, the battery casing 10 includes a cut-and-raised portion 11 that is formed by cutting and raising a part on the lens barrel 3 side of the battery casing 10 toward the front casing 1 side. In this case, as shown in FIG. 5, the tip end of the cut-and-raised portion 11 makes contact with the front casing 1. Moreover, the portion of the tip end of the cut-and-raised portion 11 making contact with the surface of the front casing 1 is processed with neither coating nor alumite treatment. With this arrangement, the cut-and-raised portion 11 is electrically connected with the front casing 1, so that the cut-and-raised portion 11 and the front casing 1 is made in an electrically conducting state. As described later, the cut-and-raised portion 11 functions as an electrostatic conducting portion for conducting the electrostatic current generated on the lens barrel 3 to the ground.

Referring to FIG. 3, the electronic circuit substrate 9 is provided on the back face of the battery casing 10. On the electronic circuit substrate 9 are mounted an electric circuit of a control system LSI (Large Scale Integration) and the like, and the circuit substrate is connected with a connector 12c at one end of the flexible cable 12 of, for example, an FPC (Flexible Printed Circuit) cable. Further, the other end of the flexible cable 12 is connected with the zoom motor 7 and the focus motor 8. A control signal from the electronic circuit substrate 9 is outputted to the zoom motor 7 and the focus motor 8 via the flexible cable 12.

Referring to FIG. 3, the flexible cable 12 and the battery casing 10 are provided at the outer peripheries of the lens barrel 3. In this case, as shown in FIG. 6, the flexible cable 12 is separated from the battery casing 10 so that the flexible cable 12 is not inductively coupled with the battery casing 10. In concrete, the flexible cable 12 is mounted at locations of the front casing 1 where the flexible cable 12 does not face (does not become parallel to) the side face 10s on the lens barrel 3 side at a predetermined interval between the cable and the battery casing 10. With this arrangement, no electrostatic discharge occurs between the battery casing 10 and the flexible cable 12.

1-2. Operation

A path for allowing the electrostatic current due to the static electricity generated on the lens barrel 3 to flow out to the ground is described next.

Figure 7:
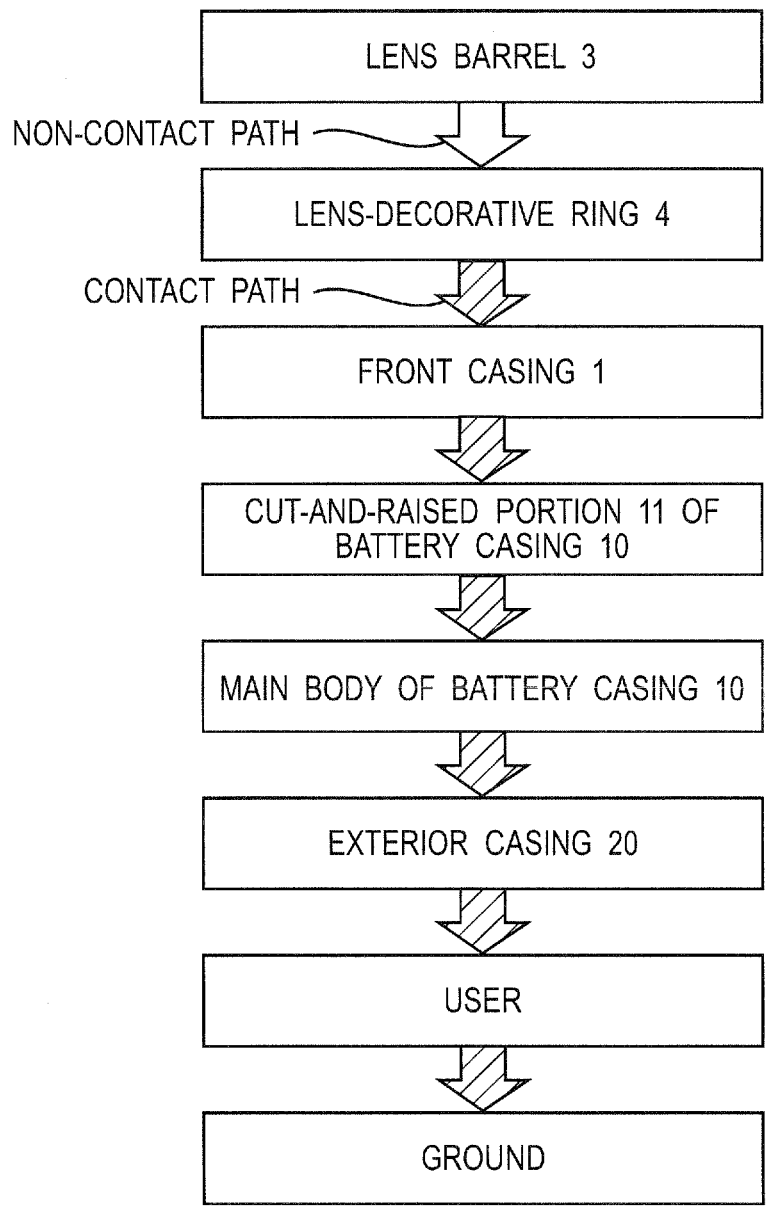
FIG. 7 is a path diagram showing a discharge path of an electrostatic current in the digital camera 100 of FIG. 1.

FIG. 7 is a path diagram showing a discharge path of an electrostatic current in the digital camera 100 of FIG. 1. In FIG. 7 and the following FIGS. 9, 11 and 13, each hatched arrow indicates a path through which two constituent elements described at both ends of the arrow make contact with each other. In this case, the constituent elements described at both ends of the arrow make contact with each other and electrically connected together via the path through which they make contact to be in an electrically conducting state. On the other hand, each arrow that is not hatched indicates a non-contact path between two constituent elements described at both ends of the arrow. In this case, the components described at both ends of the arrow do not make contact with each other but in adjacency, and they are inductively coupled with each other via the non-contact path.

Referring to FIG. 7, static electricity is generated on the lens barrel 3 when the lens barrel 3 is driven, so that the lens barrel 3 and adjacent portions are electrically charged. Then, an electrostatic current flows due to electrostatic discharge through a gap between the pieces of the lens barrel 3. Further, since the lens barrel 3 and the lens-decorative ring 4 are inductively coupled with each other via the gap between the lens barrel 3 and the lens-decorative ring 4, the electrostatic current flows from the lens barrel 3 to the lens-decorative ring 4 via this gap (non-contact path). Then, the current flows from the lens-decorative ring 4 to the main body of the battery casing 10 via the front casing 1 and the cut-and-raised portion 11 making contact with the front casing 1. The electrostatic current that flowed to the main body of the battery casing 10 flows to the ground via the discharge path including the cut-and-raised portion 11, the entire exterior casing 20, and the user.

1-3. Advantageous Effects and so on

As described above, the digital camera 100 of the first embodiment is configured to include the battery casing 10 and the metallic lens barrel 3 provided movably in the optical axis direction of the imaging optical system. In this case, the battery casing 10 has the cut-and-raised portion 11 formed by cutting and raising a part of the battery casing 10, and the cut-and-raised portion 11 is formed so as to electrically discharge the lens barrel 3 charged with static electricity via the discharge path including the cut-and-raised portion 11. Moreover, the digital camera 100 further includes the metallic exterior casing 20 housing the opening 10a through which the lens barrel 3 is exposed from the inside to the outside of the digital camera 100, and the cut-and-raised portion 11 is electrically connected with the exterior casing 20.

Therefore, the electrostatic current generated on the lens barrel 3 flows to the ground via the discharge path including the lens-decorative ring 4 and the front casing 1 of the exterior casing 20, the cut-and-raised portion 11 and the main body of the battery casing 10 without flowing via the electronic circuit substrate 9, so that the charged lens barrel 3 is electrically discharged. Therefore, the control system LSI mounted on the electronic circuit substrate 9 can be prevented from false operation. That is, the false operation of the digital camera 100 can be reduced.

Moreover, the flexible cable 12 is mounted at locations where the cable does not face the battery casing 10 and separated from the battery casing 10. The electrostatic current flowing through the battery casing 10 is a high-frequency current, and therefore, the same electrostatic current flows only on the surface of the battery casing 10 by the skin effect. Further, a high-frequency magnetic field proportional to the high-frequency current is generated on the battery casing 10. Therefore, when the flexible cable 12 is provided at locations where the cable faces the side face 10s of the battery casing 10, the flexible cable 12 is inductively coupled with the battery casing 10, so that an induced electromotive force is generated in the flexible cable 12, and a current flows through the control system LSI on the electronic circuit substrate 9 via the flexible cable 12. As a result, the control system LSI on the electronic circuit substrate 9 becomes in a false operation state. In contrast to this, according to the present embodiment, the flexible cable 12 is mounted at locations where the cable does not face the battery casing 10, and therefore, the flexible cable 12 can be prevented from being inductively coupled with the battery casing 10. Therefore, the control system LSI on the electronic circuit substrate 9 can be prevented from the false operation.

Although the cut-and-raised portion 11 makes contact with the front casing 1 in the present embodiment, the present disclosure is not limited to this. The cut-and-raised portion 11 may be provided to be adjacent to the front casing 1 via a predetermined gap so as to be inductively coupled with the front casing 1. In this case, an interval between the cut-and-raised portion 11 and the front casing 1 is set, for example, to be equal to or smaller than 0.5 mm.

Second Embodiment

The second embodiment is described below with reference to FIGS. 1 to 3 and FIGS. 8 to 9.

2-1. Configuration

Figure 8:
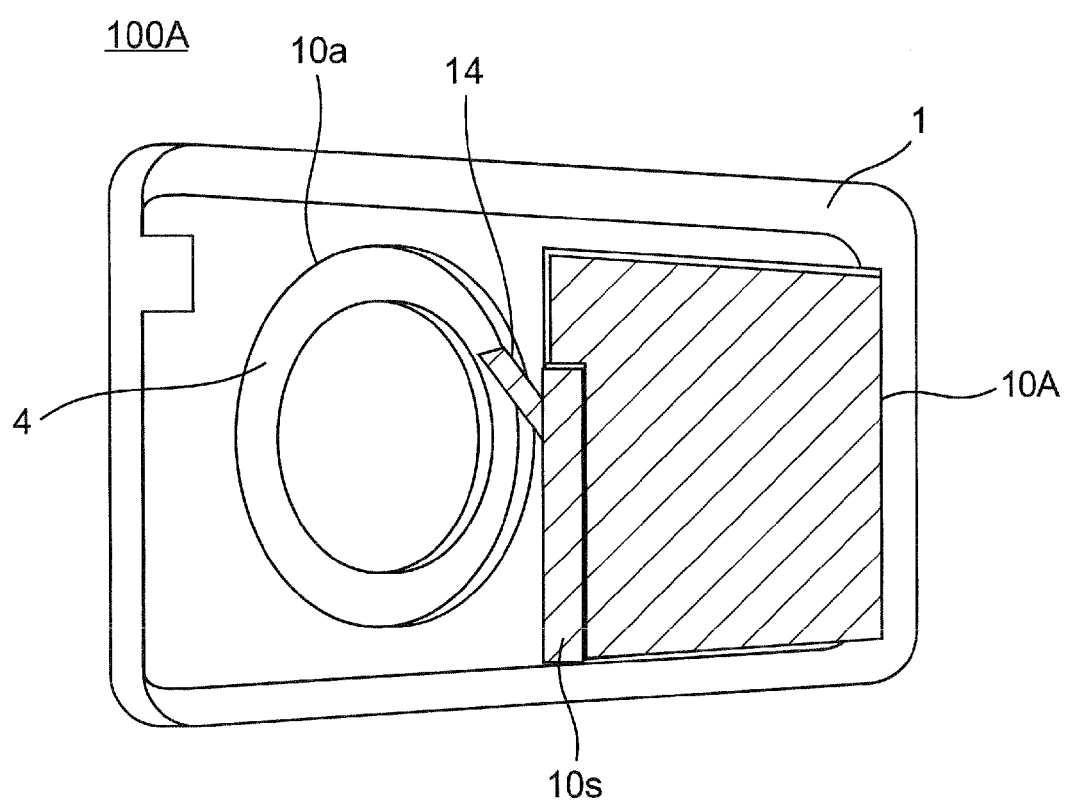
FIG. 8 is a perspective view showing the front casing 1, a battery casing 10A, a cut-and-raised portion 14 and the lens-decorative ring 4 of a digital camera 100A according to a second embodiment.

FIG. 8 is a perspective view showing a front casing 1, a battery casing 10A, a cut-and-raised portion 14, and a lens-decorative ring 4 of a digital camera 100A according to the second embodiment. The digital camera 100A of the present embodiment differs from the digital camera 100 of the first embodiment in that the battery casing 10A is provided in place of the battery casing 10, and is configured in a manner similar to that of the digital camera 100 in terms of the other points. The points of difference from the first embodiment are described below.

Referring to FIG. 8, the battery casing 10A has the cut-and-raised portion 14 in place of the cut-and-raised portion 11 as compared with the battery casing 10. In this case, the tip end of the cut-and-raised portion 14 makes contact with the metallic lens-decorative ring 4. Moreover, the portion of the surface of the lens-decorative ring 4 making contact with the tip end of the cut-and-raised portion 14 is processed neither with coating nor alumite treatment. With this arrangement, the cut-and-raised portion 14 is electrically connected with the lens-decorative ring 4, so that the cut-and-raised portion 14 and the lens-decorative ring 4 are made in an electrically conducting state. As described later, the cut-and-raised portion 14 functions as an electrostatic conducting portion for conducting the electrostatic current generated on the lens barrel 3 to the ground.

2-2. Operation

A path for allowing the electrostatic current due to the static electricity generated on the lens barrel 3 to flow out to the ground is described next.

Figure 9:
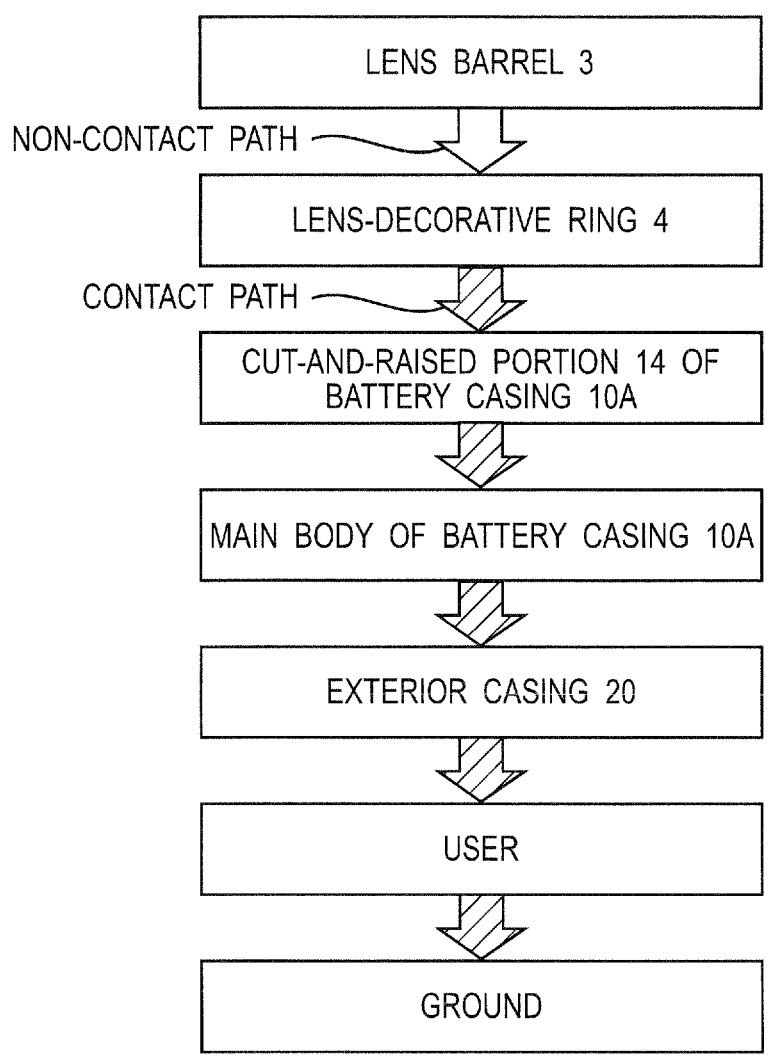
FIG. 9 is a path diagram showing a discharge path of an electrostatic current in the digital camera 100A of FIG. 8.

FIG. 9 is a path diagram showing a discharge path of an electrostatic current in the digital camera 100A of FIG. 8. Referring to FIG. 9, static electricity is generated on the lens barrel 3 when the lens barrel 3 is driven, so that the lens barrel 3 and adjacent portions are electrically charged. Then, an electrostatic current flows due to electrostatic discharge through a gap between the pieces of the lens barrel 3. Further, since the lens barrel 3 and the lens-decorative ring 4 are inductively coupled with each other via the gap between the lens barrel 3 and the lens-decorative ring 4, an electrostatic current flows from the lens barrel 3 to the lens-decorative ring 4 via this gap (non-contact path). Then, the current flows from the lens-decorative ring 4 to the main body of the battery casing 10A via the cut-and-raised portion 14 making contact with the lens-decorative ring 4. The electrostatic current that flowed to the main body of the battery casing 10A flows to the ground via the discharge path including the cut-and-raised portion 14, the entire exterior casing 20 and the user.

2-3. Advantageous Effects and so on

As described above, the digital camera 100A of the second embodiment is configured to include the battery casing 10A and the metallic lens barrel 3 provided movably in the optical axis direction of the imaging optical system. In this case, the battery casing 10A has the cut-and-raised portion 14 formed by cutting and raising a part of the battery casing 10A, and the cut-and-raised portion 14 is formed so as to electrically discharge the lens barrel 3 charged with static electricity via the discharge path including the cut-and-raised portion 14. Moreover, the digital camera 100A further includes the metallic exterior casing 20 having the opening 10a through which the lens barrel 3 is exposed from the inside to the outside of the digital camera 100A, the exterior casing 20 includes the metallic lens-decorative ring 4 provided at the opening 10a, and the cut-and-raised portion 14 is electrically connected with the lens-decorative ring 4.

Therefore, the electrostatic current generated on the lens barrel 3 flows to the ground via the discharge path including the lens-decorative ring 4, the cut-and-raised portion 14 and the main body of the battery casing 10A without flowing via the electronic circuit substrate 9, so that the charged lens barrel 3 is electrically discharged. Therefore, the control system LSI mounted on the electronic circuit substrate 9 can be prevented from the false operation. That is, the false operation of the digital camera 100 can be reduced.

Although the cut-and-raised portion 14 makes contact with the lens-decorative ring 4 in the present embodiment, the present disclosure is not limited to this. The cut-and-raised portion 14 may be provided to be adjacent to the lens-decorative ring 4 via a predetermined gap so as to be inductively coupled with the lens-decorative ring 4. In this case, an interval between the cut-and-raised portion 14 and the lens-decorative ring 4 is set, for example, to be equal to or smaller than 0.5 mm.

Third Embodiment

A third embodiment is described below with reference to FIG. 1 and FIGS. 10 to 11.

3-1. Configuration

Figure 10:
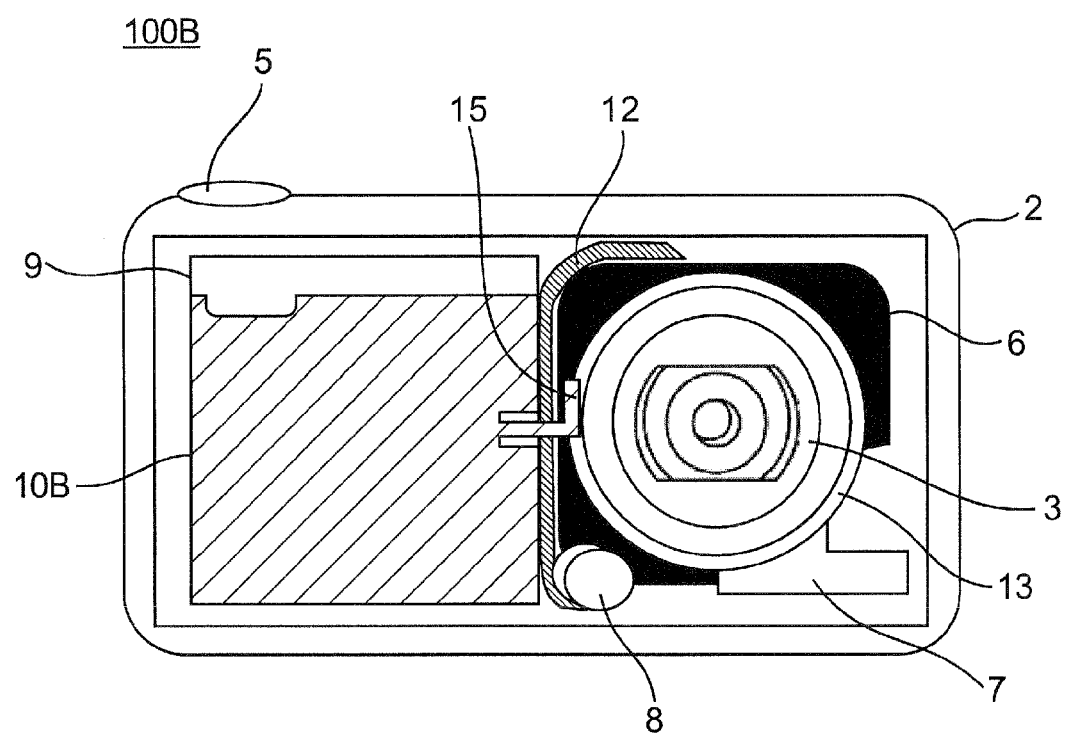
FIG. 10 is a front view showing a configuration of a digital camera 100B according to a third embodiment.

FIG. 10 is a front view showing a configuration of a digital camera 100B according to the third embodiment. The digital camera 100B of the present embodiment differs from the digital camera 100 of the first embodiment in that a battery casing 10B is provided in place of the battery casing 10, and is configured in a manner similar to that of the digital camera 100 in terms of the other points. The points of difference from the first embodiment are described below.

Referring to FIG. 10, the battery casing 10B has a cut-and-raised portion 15 in place of the cut-and-raised portion 11 as compared with the battery casing 10. In this case, the tip end of the cut-and-raised portion 15 makes contact with the side surface of the metallic lens barrel frame 13. Moreover, the portion of the surface of the lens barrel frame 13, with which the tip end of cut-and-raised portion 15 makes contact, is processed with neither coating nor alumite treatment. With this arrangement, the cut-and-raised portion 15 is electrically connected with the lens barrel frame 13, so that the cut-and-raised portion 15 and the lens barrel frame 15 are made in an electrically conducting state. As described later, the cut-and-raised portion 15 functions as an electrostatic conducting portion for conducting the electrostatic current generated on the lens barrel 3 to the ground.

3-2. Operation

A path for allowing the electrostatic current due to the static electricity generated on the lens barrel 3 to flow out to the ground is described next.

Figure 11:
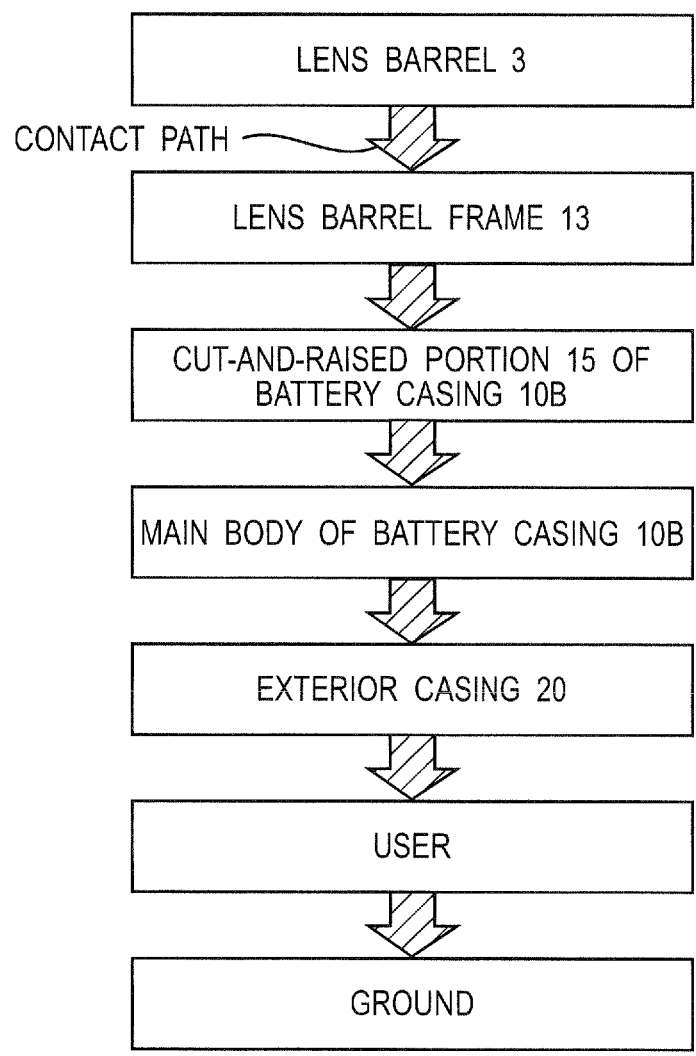
FIG. 11 is a path diagram showing a discharge path of an electrostatic current in the digital camera 100B of FIG. 10.

FIG. 11 is a path diagram showing a discharge path of the electrostatic current in the digital camera 100B of FIG. 10. Referring to FIG. 11, static electricity is generated on the lens barrel 3 when the lens barrel 3 is driven, so that the lens barrel 3 and adjacent portions are electrically charged. Then, an electrostatic current flows due to an electrostatic discharge to a gap between the pieces of the lens barrel 3. Further, the electrostatic current flows from the lens barrel 3 to the lens barrel frame 13 making contact with the lens barrel 3. Then, the current flows from the lens barrel frame 13 to the main body of the battery casing 10B via the cut-and-raised portion 15 making contact with the lens barrel frame 13. The electrostatic current that flowed to the main body of the battery casing 10B flows to the ground via the discharge path including the cut-and-raised portion 15, the entire exterior casing 20 and the user.

3-3. Advantageous Effects and so on

As described above, the digital camera 100B of the third embodiment configured to include the battery casing 10B and the metallic lens barrel 3 provided movably in the optical axis direction of the imaging optical system. In this case, the battery casing 10B has the cut-and-raised portion 15 formed by cutting and raising a part of the battery casing 10B, and the cut-and-raised portion 15 is formed so as to electrically discharge the lens barrel 3 charged with static electricity via the discharge path including the cut-and-raised portion 15. Moreover, the digital camera 100B is configured to include the metallic lens barrel frame 13 to fix the lens barrel 3 to the main body of the digital camera 100B, and the cut-and-raised portion 15 is electrically connected with the lens barrel frame 13.

Therefore, the electrostatic current generated on the lens barrel 3 flows to the ground via the discharge path including the lens barrel frame 13, the cut-and-raised portion 15, and the main body of the battery casing 10B, without flowing via the electronic circuit substrate 9, so that the charged lens barrel 3 is electrically discharged. Therefore, the control system LSI mounted on the electronic circuit substrate 9 can be prevented from the false operation. That is, the false operation of the digital camera 100B can be reduced.

Fourth Embodiment

A fourth embodiment is described below with reference to FIG. 1 and FIGS. 12 to 13.

4-1. Configuration

Figure 12:
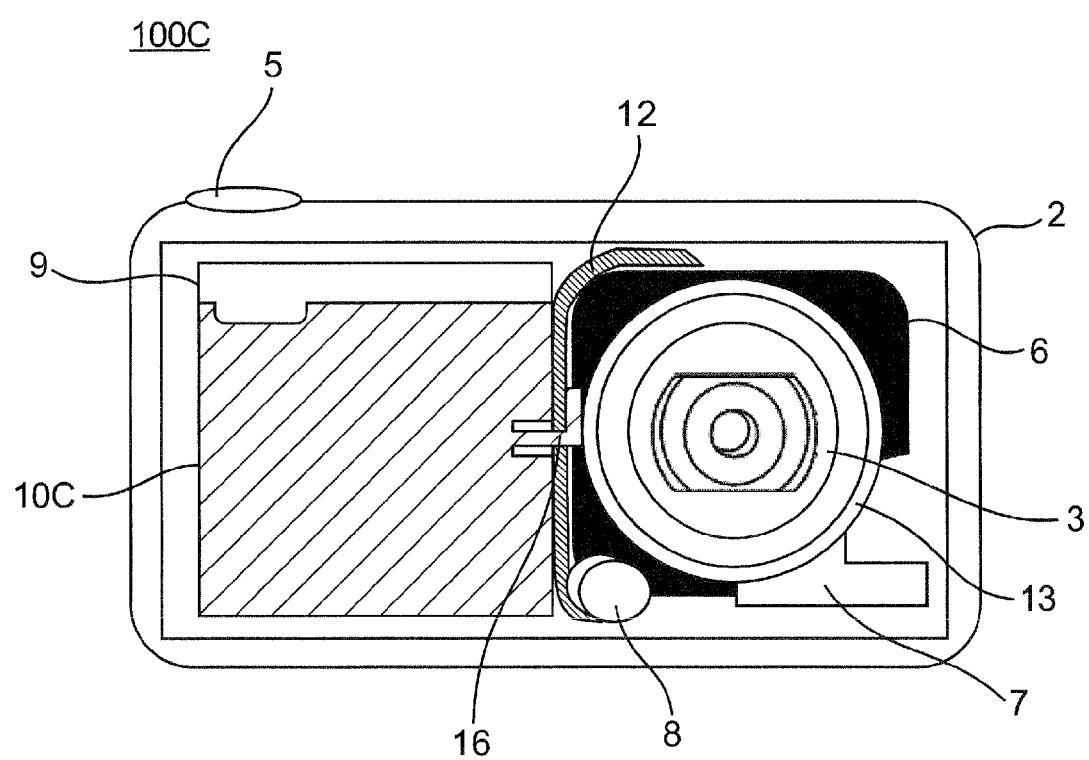
FIG. 12 is a front view showing a configuration of the inside of a digital camera 100C according to a fourth embodiment.

FIG. 12 is a front view showing a configuration of the inside of a digital camera 100C according to the fourth embodiment. The digital camera 100C of the present embodiment differs from the digital camera 100B of the third embodiment in that a battery casing 10C is provided in place of the battery casing 10B, and is configured in a manner similar to that of the digital camera 100B in terms of the other points. The points of difference from the third embodiment are described below.

Referring to FIG. 12, the battery casing 10C has a cut-and-raised portion 16 in place of the cut-and-raised portion 15 as compared with the battery casing 10B. In this case, the tip end of the cut-and-raised portion 16 is adjacent to the side surface of the lens barrel frame 13 via a predetermined gap so that the cut-and-raised portion 16 is inductively coupled with the metallic lens barrel frame 13. In concrete, an interval between the cut-and-raised portion 16 and a lens barrel frame 143 is, for example, equal to or smaller than 0.5 mm. Moreover, the portion of the surface of the lens barrel frame 13, to which the tip end of the cut-and-raised portion 16 is located to be adjacent, is processed with neither coating nor alumite treatment. As described later, the cut-and-raised portion 16 functions as an electrostatic conducting portion for conducting the electrostatic current generated on the lens barrel 3 to the ground.

4-2. Operation

Figure 13:
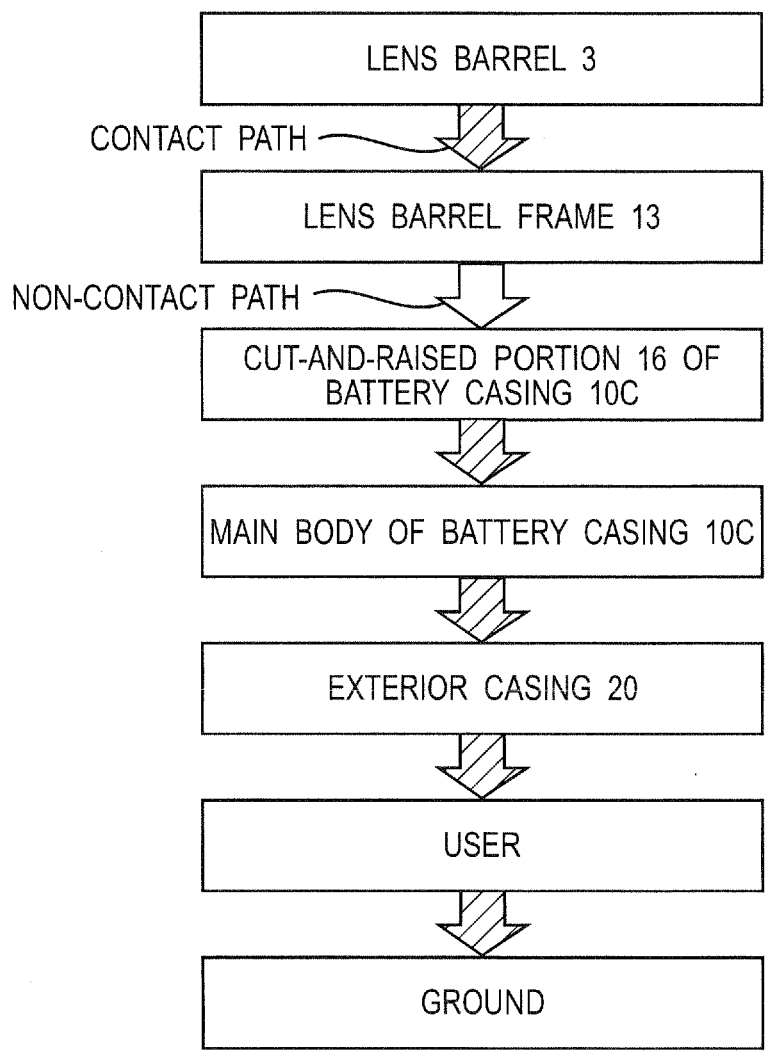
FIG. 13 is a path diagram showing a discharge path of an electrostatic current in the digital camera 100C of FIG. 12.

FIG. 13 is a path diagram showing a discharge path of an electrostatic current in the digital camera 100C of FIG. 12. Referring to FIG. 13, static electricity is generated on the lens barrel 3 when the lens barrel 3 is driven, so that the lens barrel 3 and adjacent portions are electrically charged. Then, an electrostatic current flows to a gap between the pieces of the lens barrel 3 due to electrostatic discharge. Further, the electrostatic current flows from the lens barrel 3 to the lens barrel frame 13 making contact with the lens barrel 3. Since the lens barrel frame 13 and the cut-and-raised portion 16 are inductively coupled with each other via the gap between the lens barrel frame 13 and the cut-and-raised portion 16, an electrostatic current flows from the lens barrel frame 13 to the main body of the battery casing 100 due to electrostatic discharge via this gap (non-contact path) and the cut-and-raised portion 16. The electrostatic current that flowed to the main body of the battery casing 100 flows to the ground via the discharge path including the cut-and-raised portion 16, the entire exterior casing 20 and the user.

4-3. Advantageous Effects and so on

As described above, the digital camera 100C of the fourth embodiment is configured to include the battery casing 100 and the metallic lens barrel 3 provided movably in the optical axis direction of the imaging optical system. In this case, the battery casing 100 has the cut-and-raised portion 16 formed by cutting and raising a part of the battery casing 100, and the cut-and-raised portion 16 is formed so as to electrically discharge the lens barrel 3 charged with static electricity via the discharge path including the cut-and-raised portion 16. Moreover, the digital camera 100C is configured to include the metallic lens barrel frame 13 to fix the lens barrel 3 to the main body of the digital camera 100C, and the cut-and-raised portion 16 is inductively coupled with the lens barrel frame 13.

Therefore, the electrostatic current generated on the lens barrel 3 flows to the ground via the discharge path including the lens barrel frame 13, the cut-and-raised portion 16, and the main body of the battery casing 100 without flowing via the electronic circuit substrate 9, so that the charged lens barrel 3 is electrically discharged. Therefore, the control system LSI mounted on the electronic circuit substrate 9 can be prevented from the false operation. That is, the false operation of the digital camera 100C can be reduced.

Other Embodiments

As described above, the first to fourth embodiments are described as illustrations of the technology of the present disclosure. However, the technology of the present disclosure is not limited to this but allowed to be applied to embodiments that are arbitrarily subjected to alterations, replacements, additions, omissions and so forth. Moreover, it is also possible to provide new embodiments by combining the constituent elements described in the first to fourth embodiments. Accordingly, the other embodiments are illustrated below.

Although the lens barrel 3 includes the double telescopic lens barrel in each of the aforementioned embodiments, the present disclosure is not limited to this. The present disclosure can be also applied to a multiple telescopic lens barrel having three or four pieces.

Moreover, although the description is made by taking the digital cameras 100, 100A, 100B and 100C as examples in the aforementioned embodiments, the present disclosure can be applied to image pickup apparatuses such as digital still cameras and digital video cameras other than these digital cameras.

Further, although the flexible cable 12 is separated so as not to face the battery casings 10, 10A, 10B and 10C in the aforementioned embodiments, the present disclosure is not limited to this. The flexible cable 12 is required to be separated from the battery casings 10, 10A, 10B and 10C so that the flexible cable 12 is not inductively coupled with the battery casings 10, 10A, 10B and 10C.

Furthermore, although the electrostatic current generated on the lens barrel 3 is flowed to the metallic battery casing 10, 10A, 10B or 10C in the aforementioned embodiments, the present disclosure is not limited to this. It is acceptable to provide a metal body for electrical discharge to flow the electrostatic current generated on the lens barrel 3 inside the exterior casing 20 in place of the battery casing 10, 10A, 10B or 10C. In this case, the metal body for electrical discharge has the aforementioned cut-and-raised portion 11, 14, 15 or 16. It is noted that no new component needs to be provided for the prior art digital camera when the battery casing 10, 10A, 10B or 100 is employed.

Therefore, the constituent elements described in the accompanying drawings and the detailed description possibly include not only the indispensable constituent elements for solving the problems but also the constituent elements that are not indispensable for solving the problems in illustrating the technology. Therefore, it should not be certified that those dispensable constituent elements are immediately accredited to be indispensable with the fact that those dispensable constituent elements are described in the accompanying drawings and the detailed description.

Moreover, the aforementioned embodiments, which are to illustrate the technology of the present disclosure, can therefore be subjected to various alterations, replacements, additions, omissions and so on within the scope of the claims or the equivalent scope.

The present disclosure can be utilized for image pickup apparatuses such as digital cameras and digital video cameras, and is particularly useful for image pickup apparatuses and the like on which compact high-magnification retractable lenses are mounted.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. An image pickup apparatus comprising:
   a metal body;
   a metallic lens barrel provided movably in an optical axis direction of an imaging optical system; and
   a metallic exterior casing having an opening that exposes the lens barrel from inside to outside the image pickup apparatus,
   wherein the metal body comprises a cut-and-raised portion formed by cutting and raising a part of the metal body,
   wherein the cut-and-raised portion is electrically connected with the exterior casing or inductively coupled with the exterior casing,
   wherein the cut-and-raised portion is formed to electrically discharge the lens barrel charged with static electricity via a discharge path including the cut-and-raised portion, and
   wherein a static electrical current generated in the lens barrel flows to ground via the discharge path including the exterior casing, the cut-and-raised portion and the metal body, without flowing via any electric substrate, thereby discharging a charged lens barrel.

2. An image pickup apparatus comprising:
   a metal body;
   a metallic lens barrel provided movably in an optical axis direction of an imaging optical system; and
   a metallic exterior casing having an opening that exposes the lens barrel from inside to outside the image pickup apparatus,
   wherein the metal body comprises a cut-and-raised portion formed by cutting and raising a part of the metal body,
   wherein the exterior casing comprises a metallic lens-decorative ring mounted in the opening,
   wherein the cut-and-raised portion is electrically connected with the lens-decorative ring or inductively coupled with the lens-decorative ring, and
   wherein a static electrical current generated in the lens barrel flows to ground via a discharge path including the lens-decorative ring, the cut-and-raised portion and the metal body, without flowing via any electric substrate, thereby discharging a charged lens barrel.

3. An image pickup apparatus comprising:
   a metal body;
   a metallic lens barrel provided movably in an optical axis direction of an imaging optical system;
   a metallic exterior casing having an opening that exposes the lens barrel from inside to outside the image pickup apparatus; and
   a metallic lens barrel frame that fixes the lens barrel on a main body of the image pickup apparatus,
   wherein the metal body comprises a cut-and-raised portion formed by cutting and raising a part of the metal body,
   wherein the cut-and-raised portion is electrically connected with the lens barrel frame or inductively coupled with the lens barrel frame, and
   wherein a static electrical current generated in the lens barrel flows to ground via a discharge path including the lens barrel frame, the cut-and-raised portion and the metal body, without flowing via any electric substrate, thereby discharging a charged lens barrel.

4. The image pickup apparatus as claimed in claim 1, wherein the image pickup apparatus comprises a flexible cable, and the flexible cable is separated so as not to be inductively coupled with the metal body.

5. The image pickup apparatus as claimed in claim 2, wherein the image pickup apparatus comprises a flexible cable, and the flexible cable is separated so as not to be inductively coupled with the metal body.

6. The image pickup apparatus as claimed in claim 3, wherein the image pickup apparatus comprises a flexible cable, and the flexible cable is separated so as not to be inductively coupled with the metal body.

7. The image pickup apparatus as claimed in claim 4, wherein the flexible cable is separated so as not to face the metal body.

8. The image pickup apparatus as claimed in claim 5, wherein the flexible cable is separated so as not to face the metal body.

9. The image pickup apparatus as claimed in claim 6, wherein the flexible cable is separated so as not to face the metal body.

10. The image pickup apparatus as claimed in claim 1, wherein the metal body is a metallic battery casing that houses a battery.

11. The image pickup apparatus as claimed in claim 2, wherein the metal body is a metallic battery casing that houses a battery.

12. The image pickup apparatus as claimed in claim 3, wherein the metal body is a metallic battery casing that houses a battery.

13. The image pickup apparatus as claimed in claim 1, wherein the cut-and-raised portion is formed by a part of the metal body located on a side of the lens barrel.

14. The image pickup apparatus as claimed in claim 2, wherein the cut-and-raised portion is formed by a part of the metal body located on a side of the lens barrel.

15. The image pickup apparatus as claimed in claim 3, wherein the cut-and-raised portion is formed by a part of the metal body located on a side of the lens barrel.

* * * * *